United States Patent [19]

Dorst et al.

[11] Patent Number: 5,043,983
[45] Date of Patent: Aug. 27, 1991

[54] TIME AND CHARGES INFORMATION DELIVERY FOR OPERATOR ASSISTANCE TELECOMMUNICATION CALLS

[75] Inventors: Gary L. Dorst, Brookfield; Francis J. Pope, III, Naperville, both of Ill.

[73] Assignee: AT&T Bell Laboratories, Murray Hill, N.J.

[21] Appl. No.: 388,189

[22] Filed: Jul. 31, 1989

[51] Int. Cl.$^5$ .............................................. H04M 3/22
[52] U.S. Cl. .................................... 370/110.1; 379/96
[58] Field of Search ...................... 370/58.1, 110.1; 379/96, 112, 122, 130, 131, 132, 136, 140, 144, 396

[56] References Cited

U.S. PATENT DOCUMENTS

| | | | |
|---|---|---|---|
| 3,364,313 | 1/1968 | Scheinman | 179/27 |
| 3,484,560 | 12/1969 | Jaeger, Jr. et al. | 179/27 |
| 4,656,624 | 4/1987 | Collins et al. | 370/60 |
| 4,797,910 | 1/1989 | Daudelin | 379/67 |
| 4,897,865 | 1/1990 | Canuel | 379/144 |
| 4,897,870 | 1/1990 | Golden | 379/144 |
| 4,899,375 | 2/1990 | Bauer et al. | 379/264 |

*Primary Examiner*—Douglas W. Olms
*Assistant Examiner*—Melvin Marcelo
*Attorney, Agent, or Firm*—W. Ulrich

[57] ABSTRACT

A time and charges information delivery arrangement is disclosed utilizing an intelligent telecommunications station (intelligent phone) for displaying that information after a termination of a call. The intelligent phone is equipped to handle CCITT (International Consultative Committee for Telephone and Telegraph) standard Layer 3 (Q.931) call control messages defined for message associated user-to-user information (MA-UUI), and is connected to a central telephone office switching system via an integrated services digital network (ISDN) basic rate interface (BRI). After an operator assistance call is terminated, the operator assistance system that processed the call sends a Q.931 SETUP message to the intelligent phone over an ISDN signaling channel (D-channel). The message includes a data block, comprising time and charges information. When the intelligent phone receives the message, it ignores the call setup request, and simply displays the information sent in the message. Thus, without any action by an operator, a public telephone customer receives time and charges information for the terminated call, without establishing a new call (B-channel call) between the operator assistance system and the intelligent phone.

20 Claims, 8 Drawing Sheets

TIME AND CHARGES INFORMATION DELIVERY FOR OPERATOR ASSISTANCE TELECOMMUNICATION CALLS

CROSS REFERENCE TO RELATED APPLICATIONS

This application is related to the application Ser. No. 388,188, entitled "Semi-Automated Operator Assistance Telecommunication Calls", filed July 31, 1989, concurrently with, and assigned to the same assignee as this application.

TECHNICAL FIELD

This invention relates to the processing of operator assistance telecommunications calls.

PROBLEM

In the present mode for operating the public telephone network, toll and assistance operators are still required for a large class of these calls. For example, toll and assistance operators are required for processing calls such as station-to-station (station) collect calls; person-to-person (person) calls including sent paid, collect, and calling card calls; and bill to third party calls. Also, at the request of public telephone customers, operators are required to provide time and charges information at the conclusion of these processed calls.

Customer-dialed operator assistance calls are usually referred to as zero plus (0+) calls because the customers dial zero (signifying an operator assistance type call) plus a directory number. Operator calls that have no customer-dialed directory number are usually referred to as zero minus (0− or 00−) calls because customers do not dial further after having dialed one or two zeroes to get the intervention of an operator.

A major expense in handling operator assistance calls is the cost of delivering time and charges information to a public telephone customer at the conclusion of a call. In the prior art, an operator delivers time and charges information responsive to a verbal request from the customer at the beginning of a call. The operator calls the customer's public telephone after his or her call is completed, and verbally relays the time and charges information.

A problem with the prior art method of delivering time and charges information is that operator work time is used in delivering the information. Furthermore, telephone network voice facilities are required for the operator to make the call to the customer's public phone. Thus, the prior art method incurs both the expense of operator work time, and the expense of using voice network facilities.

Prior art systems, such as the Traffic Services Position System (TSPS) No. 1, and the Operator Services Position System (OSPS), both manufactured by AT&T Network Systems, which require that operators only be connected to a call during the call setup time and that operators may be recalled when needed for such operations as notifying a customer of the elapsed time and charges for a call, reduce operator work time in the setting up of operator assistance calls, but do not reduce operator work time or the use of network facilities for the delivery of time and charges information.

Later arrangements reduce operator work time for collect calls and person-to-person calls (which include person-collect, person-paid, person calling card and person bill to third number). An example of such an arrangement is the more efficient call handling (MECH) process, described in a pending application of T. M. Bauer et al., Ser. No. 248,459, wherein a first operator is connected to the call after the completion of customer dialing and, for a class of calls, this operator is disconnected from the call after determining the class of charge (COC) including the billing method and any required billing data; subsequently, a second operator who may or may not be the same as the first operator is connected to the call in response to the answer signal of the called (forward) customer. Such an arrangement reduces the operator work time required to set up the call by making it unnecessary for an operator to be connected to the call during the call setup time and ringing interval, however, this arrangement does not reduce the expenses incurred for delivering time and charges information.

Thus, a problem with prior art operator assistance systems is that there is no satisfactory method of inexpensively delivering time and charges information to public telephone customers for operator assistance calls.

SOLUTION

The above problem is solved and an advance is made in the art in accordance with a new method and apparatus of our invention featuring the use of an exemplary intelligent telecommunications station (intelligent phone) for automatically receiving data from a connected switching system after a call has been terminated and without an intervention of an operator. In accordance with the invention, after an operator assistance call is terminated, the operator assistance system that processed the call sends a message including time and charges information for the call to the intelligent phone for displaying of that information. In one specific embodiment, the message is a call setup message as defined in CCITT (International Consultative Committee for Telephone and Telegraph) Q.931 standards; the call setup request is ignored by the intelligent phone, which simply displays the time and charges information sent in the message. Thus, without any action by an operator, the back party receives time and charges information for the call, and a new call is not established between the operator assistance system and the intelligent phone. Advantageously, time and charges information are delivered to the customer without using operator work time or telephone network facilities to place a call.

In the exemplary embodiment CCITT (International Consultative Committee for Telephone and Telegraph) standard Layer 3 (Q.931) call control messages defined for message associated user-to-user information (MA-UUI) carry user-to-user information elements (UUIEs) to a MECH program process for collect, person-to-person, credit card, and bill to third party calls. A back party places a call by entering call information (such as person or station call, collect, credit card or bill to third party call and the forward party name and number, and a request to receive time and charges information) into an enhanced user interface payphone, which sends the information to the MECH process as a MA-UUI element of a Q.931 SETUP message. The payphone is equipped to use MA-UUI signaling, and is connected to a central office telephone switching system via an integrated services digital network (ISDN) basic rate interface (BRI), thus providing an integrated voice (B-channel) and data communication facility (D-channel). The MECH process setsup the call to the forward party based on the information received in the UUIE. After the call is terminated, the MECH process sends the time and charges information for the call to the back party's enhanced user interface phone as part of a UUIE of a Q.931 SETUP message. Responsive to receipt of this message, the enhanced user interface phone rejects the call setup request, and displays the time and charges information for the back party. Thus, time and charges information is delivered to the back party without a call being established. Advantageously, an operator is not required to deliver time and charges information.

In accordance with one aspect of the exemplary embodiment, the intelligent public telephone generates a unique station identifier with each call origination. This identifier is included in a UUIE of a Q.931 SETUP message, and uniquely links the public telephone, and the call data gathered at the public telephone, to the outgoing call. The identifier is used by the MECH process to (1) verify time and charges information and (2) signal the public telephone to reject the call setup request delivering the time and charges information, and thereby eliminating the need to establish a circuit switched B-channel call. Telephone network facilities are only required to send the call setup request message and call setup rejection message. Advantageously, less expense is incurred for use of network facilities than in prior art arrangements.

DETAILED DESCRIPTION

Figure 1:
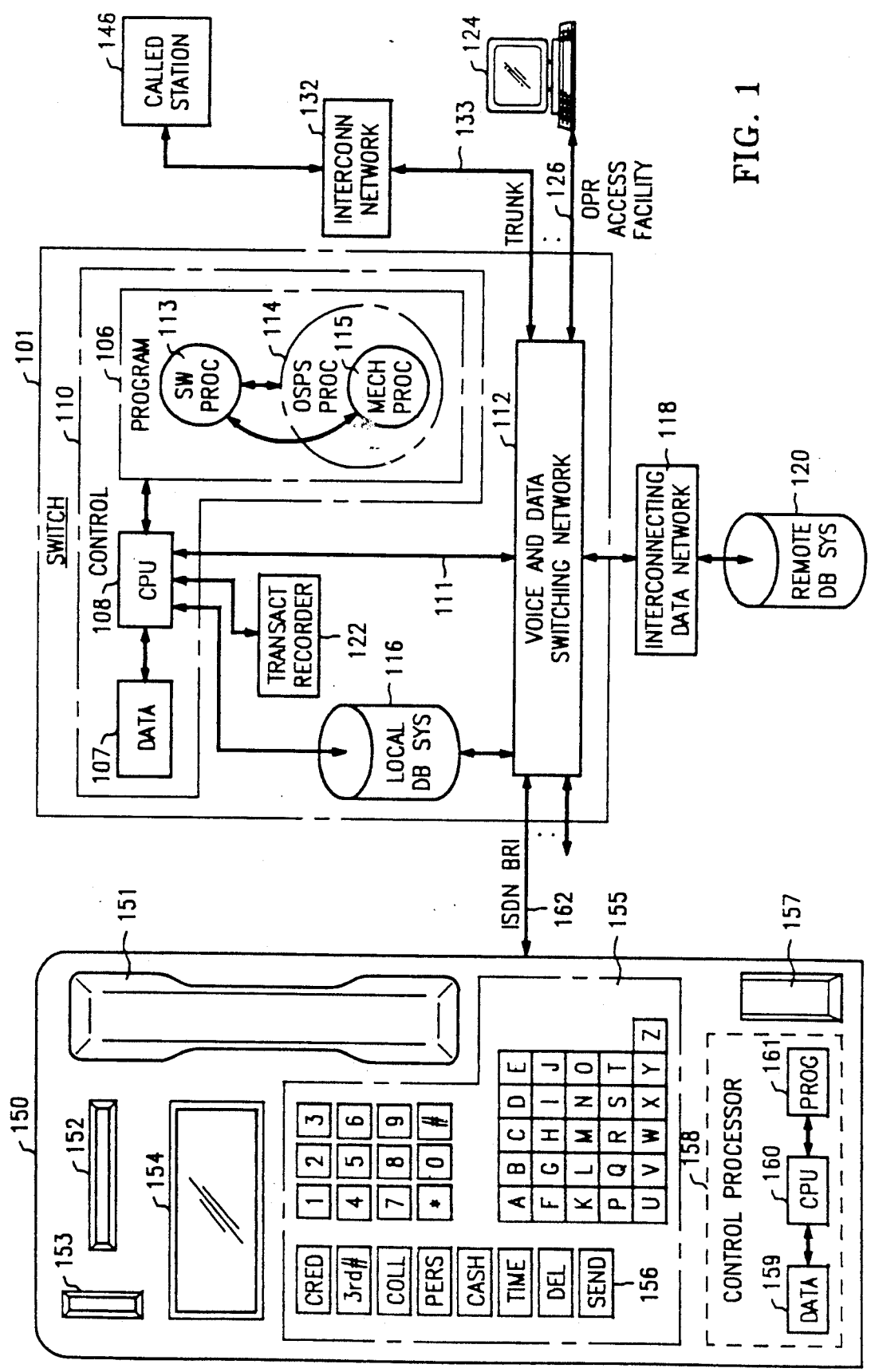
FIG. 1 is a block diagram of an operator assistance switching system for processing operator assistance calls in accordance with the methods of FIGS. 2-8.

FIG. 1 is an architectural diagram of a system illustrating one embodiment of the present invention. The system comprises an "enhanced" public telephone 150, comprising a handset 151, a credit card reader 152, a coin slot 153, a display screen 154, a keyboard 155, a coin return slot 157, and a control processor 158, comprising a data store 159, a central processing unit (CPU) 160, and a program 161 for controlling the operations of the CPU 160. The public phone is equipped with an International Consultative Committee for Telephone and Telegraph (CCITT) Integrated Services Digital Network (ISDN) Basic Rate Interface (BRI), as described in CCITT Red Book Fascicle III.5 Series 1 Recommendation, and has the capability of handling standard Q.931 interface, as described in CCITT Red Book Fascicle VI.9 Recommendation Q.931. The public phone 150 uses CCITT standard message associated user-to-user information (MA-UUI) signaling, and is connected to a switching system 101 via an ISDN BRI 162.

The switching system (switch) 101 is a 5ESS® switch, extensively described in *AT&T Technical Journal*, Vol. 64, No. 6, part 2, pp. 1305-1564, July/August 1985, which also serves as an Operator Services Position System (OSPS) as described in N.X. DeLessio et al.: "An Integrated Operator Services Capability for the 5ESS Switching System", *International Switching Symposium'84*, (Florence), Session 22C, Paper 3, pp. 1-5, May 1984. The change required in the switching system to implement the present invention is the addition of a program in the control 110 of the switch for executing the tasks described in the flow charts of FIGS. 4-7. The switch 101 comprises a control 110 for controlling the switch. The control 110, in turn, comprises a central processing unit 108, a program 106 for controlling the operations of the central processing unit, and a data store 107 for storing call data. The program 106 comprises switching processes 113 to handle the switching of calls, an operator services position system (OSPS) process 114 to handle operator assistance calls, and the more efficient call handling (MECH) process 115 to more efficiently handle operator assistance calls. The switch also comprises a local data base system 116 storing data such as: (1) customer lines connected to the system, such as the Q.931 equipped customer line 162, (2) interconnecting networks 132, (3) trunks, such as trunk 133 connected to the system, and (4) data about operator positions connected to the system, A transaction recorder 122 is used for recording billing data. The switch also comprises a voice and data switching network 112 which can be used for transmitting data among control unit 110 interconnecting data network 118 and operator access facility 126, and for transmitting voice among trunks coming into the system, such as trunk 133 to interconnecting network 132, customer lines such as customer line 162 and operator access facilities such as operator access facility 126. The interconnecting network 132 which may include one or more switching systems is used for accessing the called customer station 146 from switch 101. Operator position 124, connected to the voice and data switching network 112 by operator access facility 126, comprises a video terminal for displaying data obtained from control 110, local data base system 116, and remote data base system 120. While a typical system would have many operator positions attached, for clarity, only one is shown herein. Remote data base system 120 is connected to voice and data switching network 112 via interconnecting data network 118. Voice and data switching network 112 is connected to control unit 110 via a control connection 111. Interconnecting data network 118 and remote data base system 120 are used for obtaining data about the calling or called terminal and/or called station when this data is not available in the local data base system 116.

In this specific embodiment of the present invention, a calling (back) party makes a call from the public telephone 150 by entering call information on the keyboard 155, responsive to a request from a menu on the display screen 154. The back party completes the calling procedure by pressing the send button 157 on the keyboard 155. The enhanced public phone 150 then formats the call information into a user-to-user information element (UUIE) of a Q.931 SETUP message, places the UUIE into a SETUP message, and sends the message to the voice and data switching network 112 of the switching system 101, which routes the call to the OSPS process 114. The OSPS process 114 opens the UUIE to validate the call information and handle any error conditions, and sends the information to the MECH process 115. The MECH process 115 uses the information provided in the UUIE to set up a connection to a called (forward) party station 146. Once a connection to the forward party station 146 is set up via trunk 133 and interconnecting network 132 to forward party station 146, and an answer from the forward party station 146 is detected in the voice and data switching network 112 and relayed via control connection 111 to control 110, control 110 then informs the MECH process 115 and causes a connection to be set up. The MECH process 115 alerts the OSPS process 114 that an operator should be queued, and an operator position is connected to the call. The connection is among the back party station 150, the forward party station 146 and an operator position, similar to operator position 124, connected via its own operator access facility, similar to operator access facility 126. Data describing the call is then displayed on the operator's terminal to permit the operator to further control the call by signaling requests for changes in the call configuration to the control 110.

Figure 2:
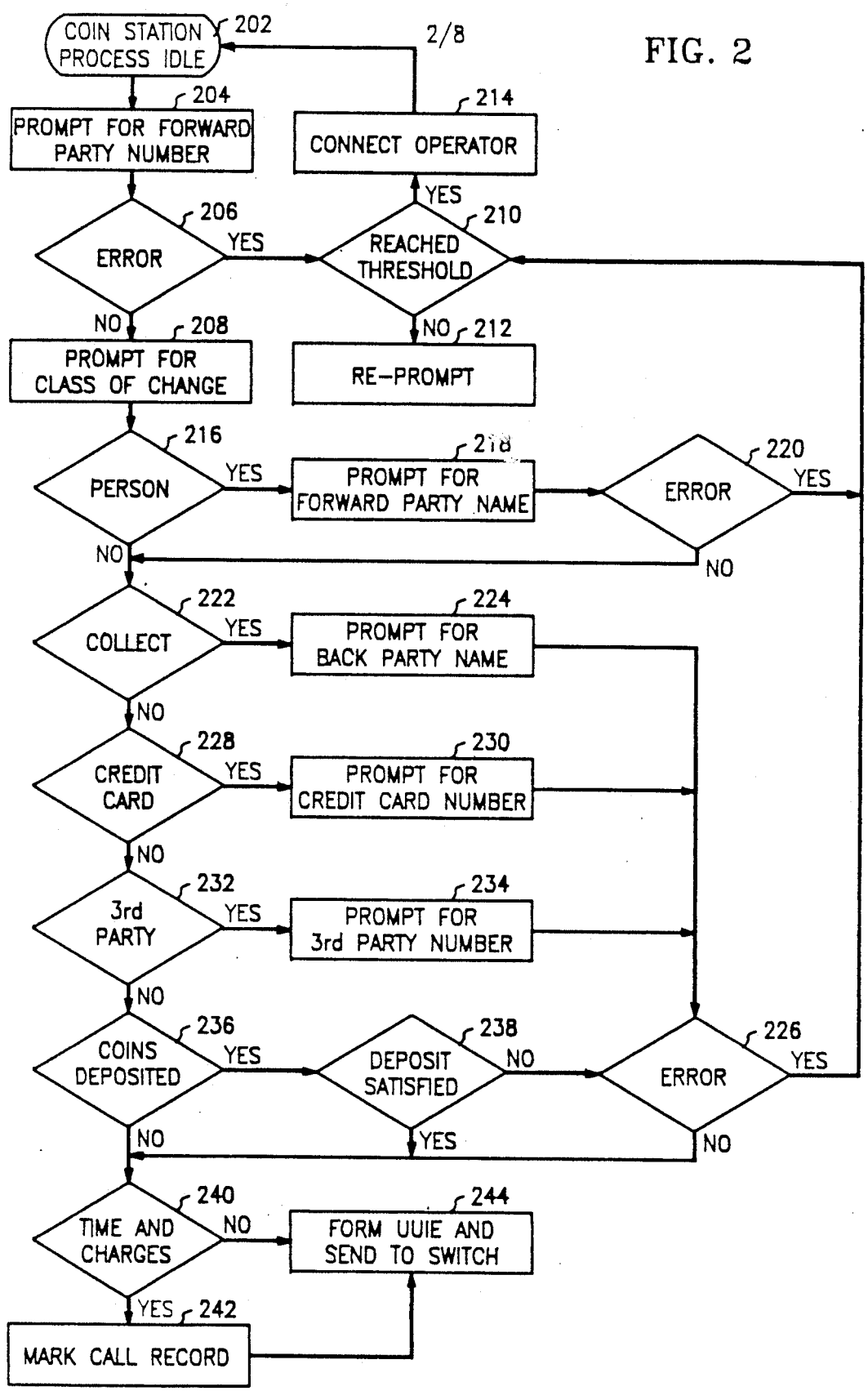
FIGS. 2-8 are data layouts and flow diagrams of methods of processing operator assistance calls in accordance with the invention.

FIG. 2 is a flow diagram of an enhanced public phone program process (coin station process) which handles the collection and sending of call information. The process which is controlled within the public telephone 150 is inactive while the coin station is idle (block 202). The process begins when a back party enters a forward party number on the keyboard of the phone (action block 204). The process then checks for errors in the forward party number (test 206). If there are errors, an error handling procedure is invoked which does the following: (1) the procedure determines whether the back party has been re-prompted to enter the information a maximum number of times (test 210); (2) if threshold has not been reached, the process re-prompts the back party for the information (action block 212); however, if the threshold has been reached, the back party is connected to an operator (action block 214) and the process returns to its idle state (block 202). Otherwise, if no error occurred in entering the forward party number, the process checks for the class of charge (COC) entered by the back party (action block 208). If the call is a person call (test 216), the enhanced phone process then waits to receive the forward party name (action block 218); if the call is collect (test 222), the process waits to receive the back party name (action block 224); if the call is a credit call charge call (test 228), the process waits for a credit card number (action block 230); finally, if the call is a third party call (test 232), the process waits to receive the third party number to be billed (action block 234). If any errors occur in the tests or reception of any data (test 220 and test 226), the call is handled by the procedure described above.

After the COC is entered, the process then waits to receive any coins that need to be deposited (action block 236), and checks whether the required coin deposit, if any, is satisfied (test 238). If the deposit is not satisfied, the error treatment procedure, described above, is invoked; otherwise, the process next checks whether the back party wants to be informed of time and charges information after the call (test 240). If so, the call record is marked, i.e., a special octet is formed to indicate that time and charges information are requested (action block 242). Finally, the process uses the information provided by the back party together with a self generated unique coin station identifier (used for verification of proper time and charges information delivery) to form a UUIE (of a Q.931 SETUP message) to be sent to the MECH process in the switching system (action block 244), and the coin station returns to idle (block 202).

Figure 3:
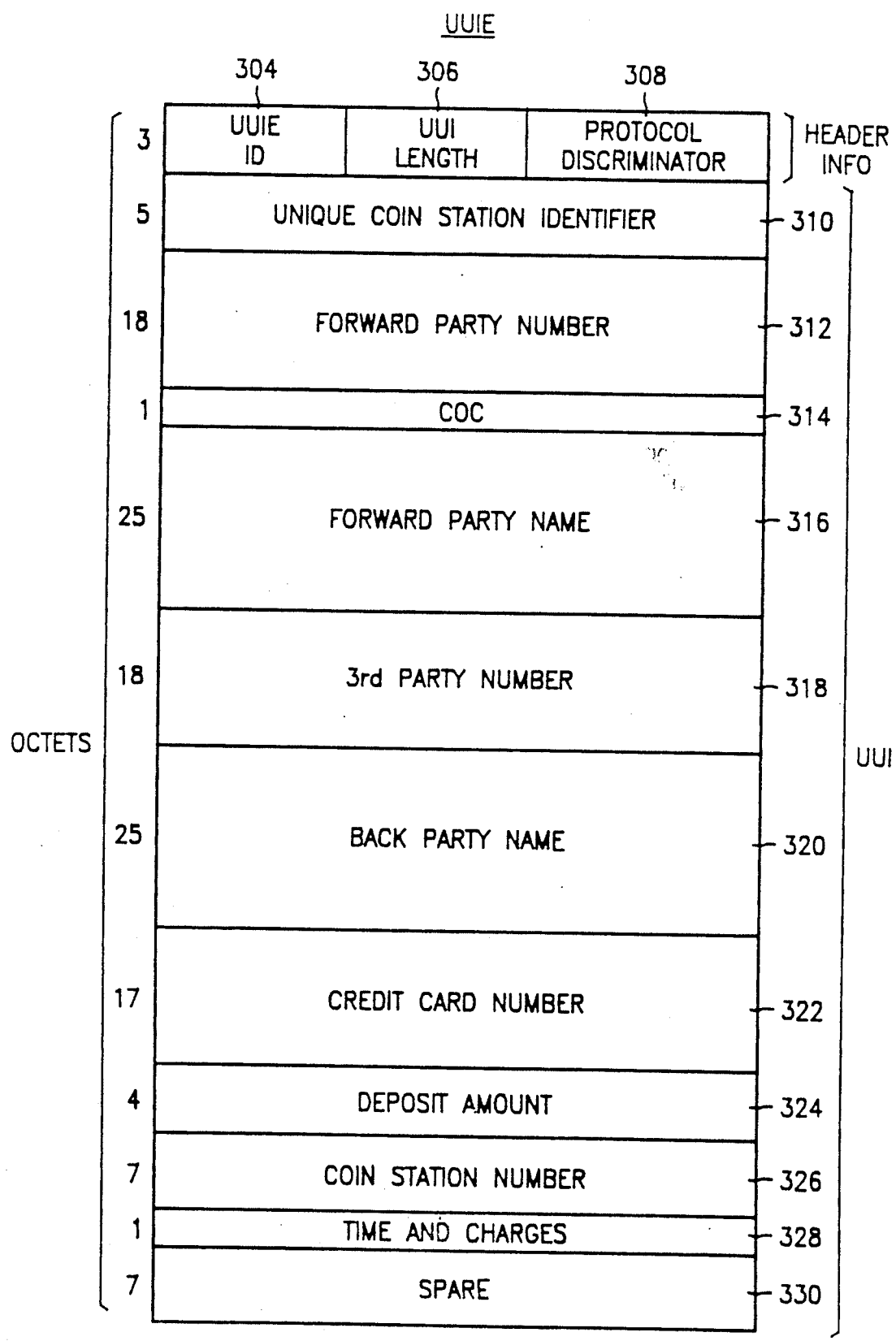
Figure 4:
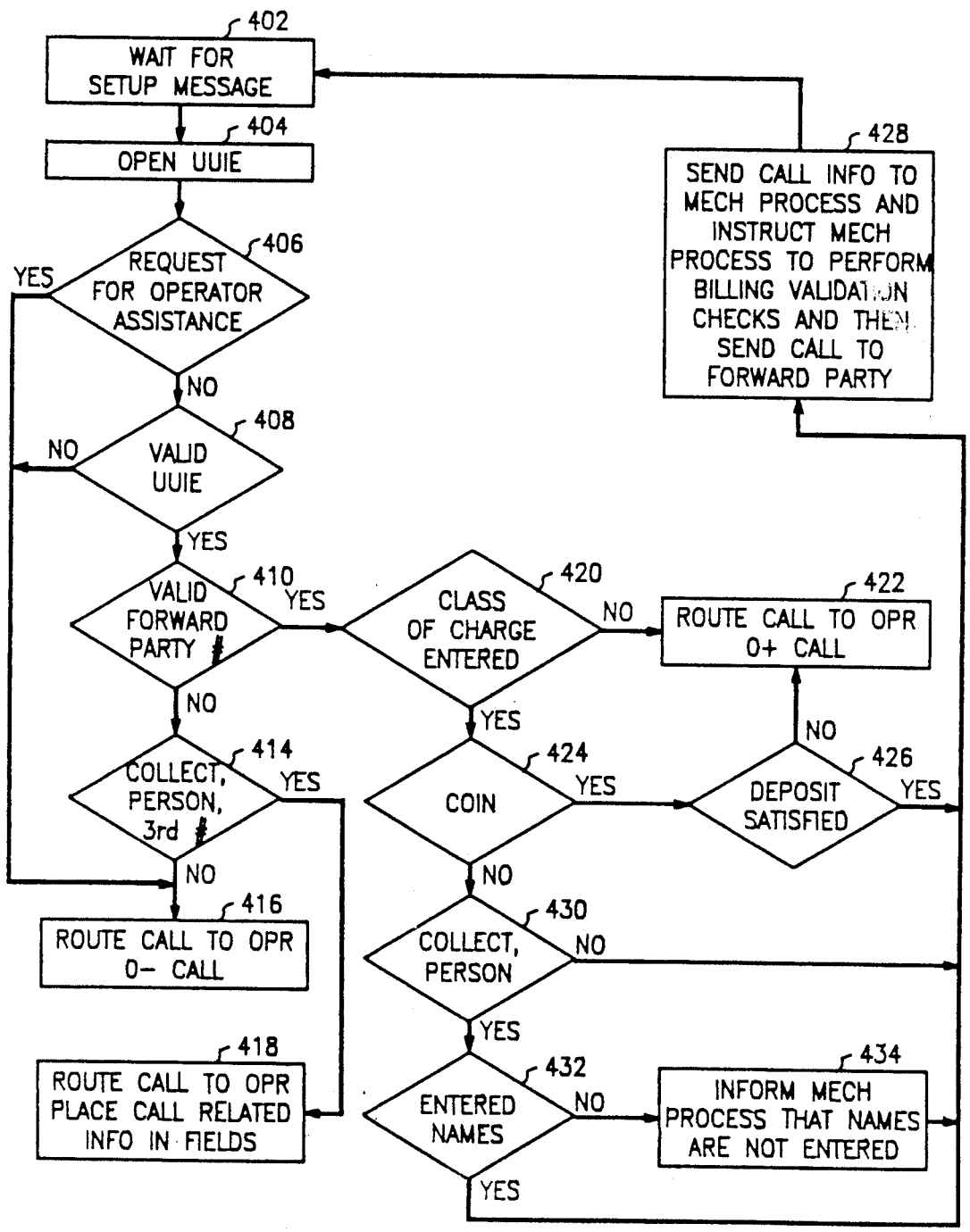

The Q.931 protocol limits the maximum length of the UUIE of a SETUP message to 131 octets, 128 of which may contain UUI and the remainder used for a message header. FIG. 3 is a diagram illustrating the structure of the UUIE in the present invention. The 3 octets of the message header contain call control information (CCI), comprising a UUIE ID 304, the length of the UUI 306, and a protocol discriminator 308. The specific embodiment of the present invention uses 121 of the possible 128 octets remainign for UUI. The UUI contains a unique coin station identifier (UCSI) 310, identifying the call, generated for each outgoing call from the phone, a forward party number 312, the COC 314, the forward party name 316, a third party name 318, a back party name 320, a credit card number 322, a deposit amount 324, a coin station number 326, and one octet to signify a request for time and charges information 328. The remaining possible seven octets 330 are unused.

FIGS. 4-7 are flow diagrams of the method of one embodiment of the present invention, starting at the point after the Q.931 SETUP message has been sent by the back party station. These figures depict the operation of an operator assistance process, comprising the OSPS process 114, and the MECH process 115. Calls that are treated in accordance with the principles of this invention are called modified MECH calls Other calls are given treatment by "standard practices" signifying treatment in accordance with the normal practices for operator assistance calls of this type as described, for example, in the *Bell System Technical Journal*, (B.S.T.J.), vol. 58, no. 6, part 1, July/August 1979, and B.S.T.J., vol. 49, no. 10, December 1970, pp. 2417-2709, especially pp. 2625-2683.

The process waits for a SETUP message to arrive at the switching system (action block 402), opening the UUIE of a message once it arrives (action block 404). It next checks for a customer for a customer request for operator (OPR) assistance (test 406), routing the call to an operator (treating call as 0—) if an OPR assistance signal is discovered (action block 416). Otherwise, the process checks whether the UUIE is valid under the protocol (test 408). If the UUIE is valid, the process then checks whether the UUIE contains a valid forward party number (action block 410), otherwise, the call is treated as a 0— call and routed to an operator (action block 416).

If the forward party number contained in the UUIE is invalid, the call is treated as a 0— call (action block 416). If the number is valid, then the call is a 0+ call; if not, the call must be sent to an operator in accordance with 0— call handling procedures, and the process then checks if the call is collect, person-to-person, or bill to third party call (test 414). The process places related call information for these types of calls into fields to be used by the operator (action block 418).

For the call is a 0+ call, the process next checks whether the class of charge for the call has been entered (test 420). If not, the call is routed to an operator (action block 422), otherwise the process next checks whether the call is a coin deposit call (test 424); if so, the process checks if the deposit has been satisfied (test 426). It routes the call to an operator if the deposit is unsatisfied (action block 422), otherwise, it sends the information contained in the UUIE to the modified MECH process, and instructs the modified MECH process to perform billing validation checks for the call and then send the call to the forward party (action block 428).

Billing validation checks are performed in conformance with standard practices to see if the calling customer entitled to place this type of call to the called station. For example, a collect call to a coin phone is not usually allowed. For the case of a person call that is to be billed to a third party, this includes verifying whether the third party accepts such billing or wishes to be called, and, if necessary, calling that third party to verify acceptance of the billing. The modified MECH process sends a call to a forward party by outpulsing the call to the telephone central office connected to the forward party. The back party is left to monitor the progress of the call. This "outpulsing" can be done over talking trunks or via separate common channel signaling facilities. It is the back party who detects busy or no answer and initiates a disconnect for those cases. The operator assistance system monitors the connection to detect the return of answer supervision.

If the call is not a coin, the process checks the COC to determine whether the call is collect or person-to-person (test 430); if not, the call information for the call is sent to the modified MECH process, along with instructions to perform billing validation checks and send the call to the forward party (action block 428). Finally, if the call is a collect or person-to-person call, the process checks the UUIE to determine whether the required names have been entered (test 432); if not, the process informs the modified MECH process that the names have not been entered (action block 434), and performs the standard instruction procedures (action block 428). If the names have been entered, the standard instruction procedures are performed (action block 428). Subsequent actions are described with respect to the flow chart FIG. 5 starting with test 502.

Figure 5:
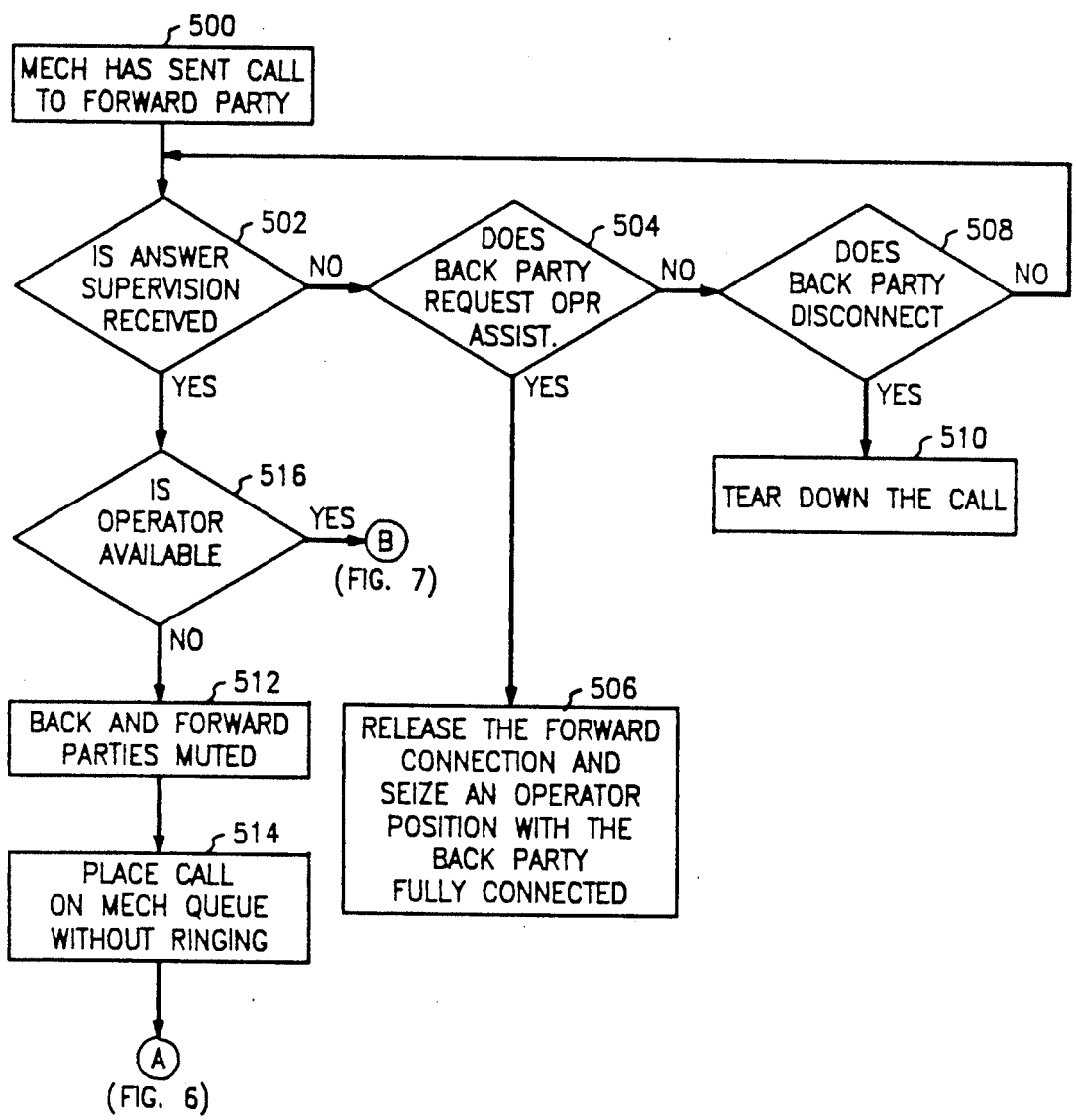

FIG. 5 describes the process of detecting an answer from the forward party and the actions performed immediately thereafter. Test 502 checks whether answer supervision is received, i.e., whether the forward party answers. If not, test 504 is performed to test whether the back party has requested OPR assistance. If the back party has requested OPR assistance, then the forward connection, i.e., the connection to the forward party is released and an operator position is connected to the back party to receive further instructions (action block 506). The back party and operator are fully connected to allow the calling customer to talk to and hear the operator at the operator position where the call history is displayed to the operator. If the back party does not request OPR assistance, a test is made to check whether the back party disconnects (test 508). If the back party disconnects, the call is torn down (action block 510). This action would be performed if the back party decides that the forward party is not answering or if the back party hears busy or overflow tone. If the back party does not disconnect, supervisory monitoring of the call for answer is resumed (test 502, previously discussed). If answer supervision is received as detected in test 502 and an OPR is available (test 516), then actions are performed in accordance with FIG. 7. If an OPR position is not available, the connection is arranged so that both the back and the forward parties are muted (action block 512), i.e., that neither calling nor called party can hear the other. The call is then placed on a high priority queue for an operator position without giving audible tone to either the back or the forward party in order to avoid confusion (action block 514). There may be several such queues in an operator assistance system, for queuing different types of modified MECH calls. Next, the actions described in FIG. 6 are performed starting with test 602.

Figure 6:
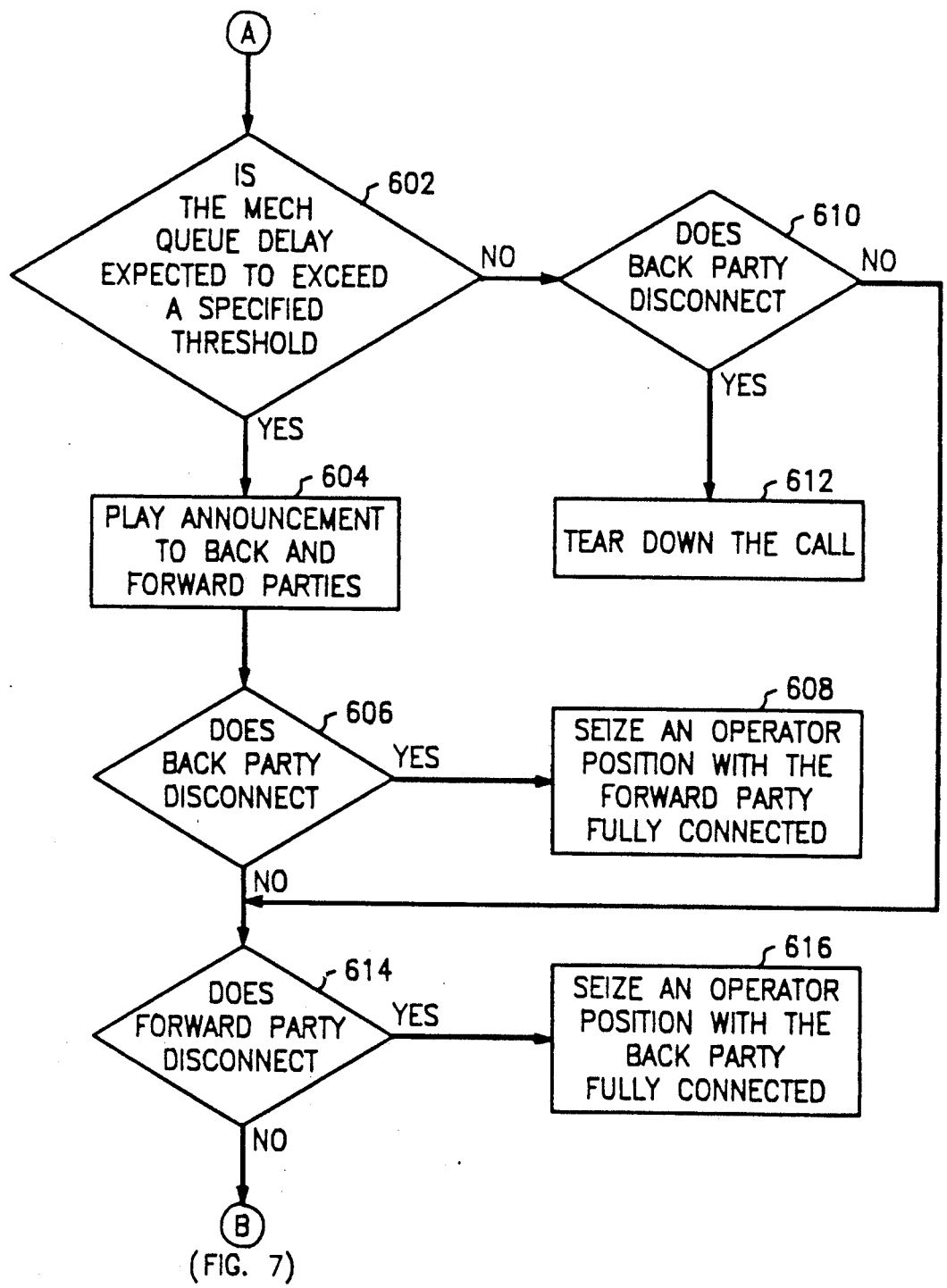

FIG. 6 describes the actions performed until an operator position can be connected to the call. Test 602 determines whether the MECH queue (i.e., the queue in which the call was entered in action block 514) is expected to introduce a delay that exceeds a specified threshold. If so, an announcement is played to both the back and the forward parties (action block 604). The announcement might say: "Please hold, an operator will be connected promptly." If the back party disconnects, as determined by test 606, then an operator position is seized (action block 608) so that the operator may talk to the forward party to explain what happened. The operator position and the forward party are fully connected to allow them to talk to each other.

If the back party disconnects before an announcement is played, as determined by test 610, then the call is torn down (action block 612). If the back party does not disconnect, with or without the announcement, then a test is made to see whether the forward party has disconnected (test 614). If so, an operator position is seized and a connection is set up with the back party (action block 616). The back party and the operator are fully connected. Requests for OPR assistance by the back party are ignored, if received, prior to a forward party disconnect or prior to the actions to be discussed below with respect to FIG. 7, starting with action block 702, because the call is already on a high priority queue for an operator.

Figure 7:
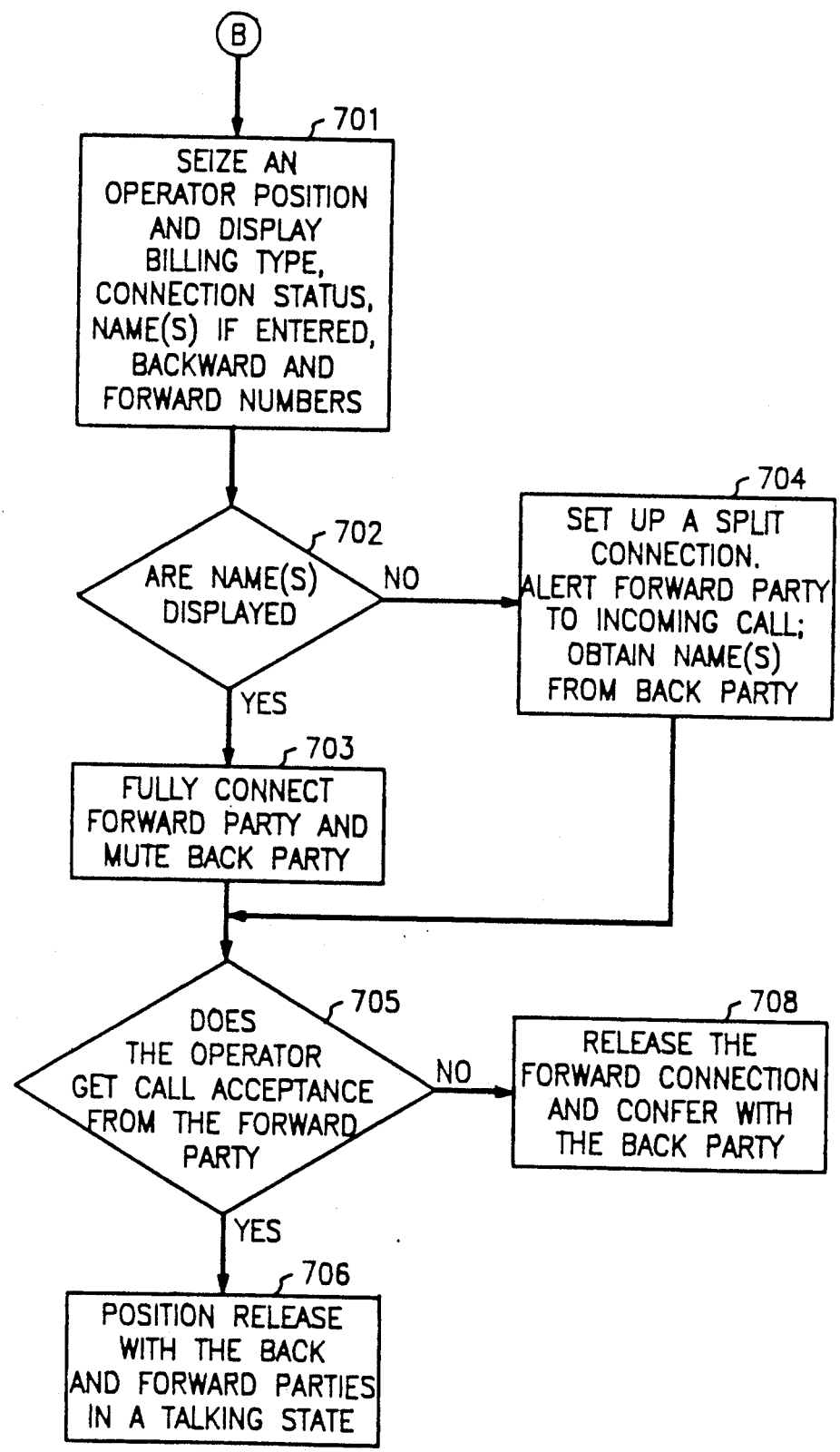

FIG. 7 describes the actions performed by the operator for a modified MECH call in the present invention. The operator position is seized, and the billing type, the connection status, and the forward and backward numbers, i.e., the called and calling numbers, are displayed (action block 701). If the appropriate names have been entered by the back party while placing the call, these are also displayed. Test 702 checks whether these names are displayed. If so, the operator signals for a connection wherein the called party is fully connected and the calling party is muted to prevent unauthorized transmission of a message from the calling party (action block 703). If not, the operator signals to set up a split connection, the called party is alerted by the operator that there is an incoming call, and the calling party is queried to obtain the appropriate name(s) (action block 704). This is the information needed by the operator to find out if a called party is willing to accept charges for a collect call, or to find out if the appropriate individual has answered a person-to-person call, and, if not, to ask for that appropriate individual. In either case, the operator seeks to get an acceptance of the call from the called party. If the operator is satisfied that the conditions for setting up the call have been met (positive output of test 705), then the operator position signals to be released from the call and the calling and called parties are connected in a full talking state (action block 706). If the operator fails to get an acceptance of the call (negative output of test 705), then the operator signals to release the forward connection (the connection to the called party) and confers further with the calling party via a full talking state connection (action block 708).

The present invention allows a operator assistence system to send time and charges information associated with an operator assistance call to a coin station following the termination of the call. If the time and charges field in the original UUIE sent from the station to the system (to establish the call) is marked to indicate a request to receive time and charges information, then the system forms a new UUIE upon termination of the call. The UUIE comprises time and charges information for the call, and a UCSI that matches the UCSI in the original UUIE sent to the system for that call. The system places the new UUIE into a Q.931 SETUP message, and sends the SETUP message to the station via an ISDN D-channel of the BRI.

Figure 8:
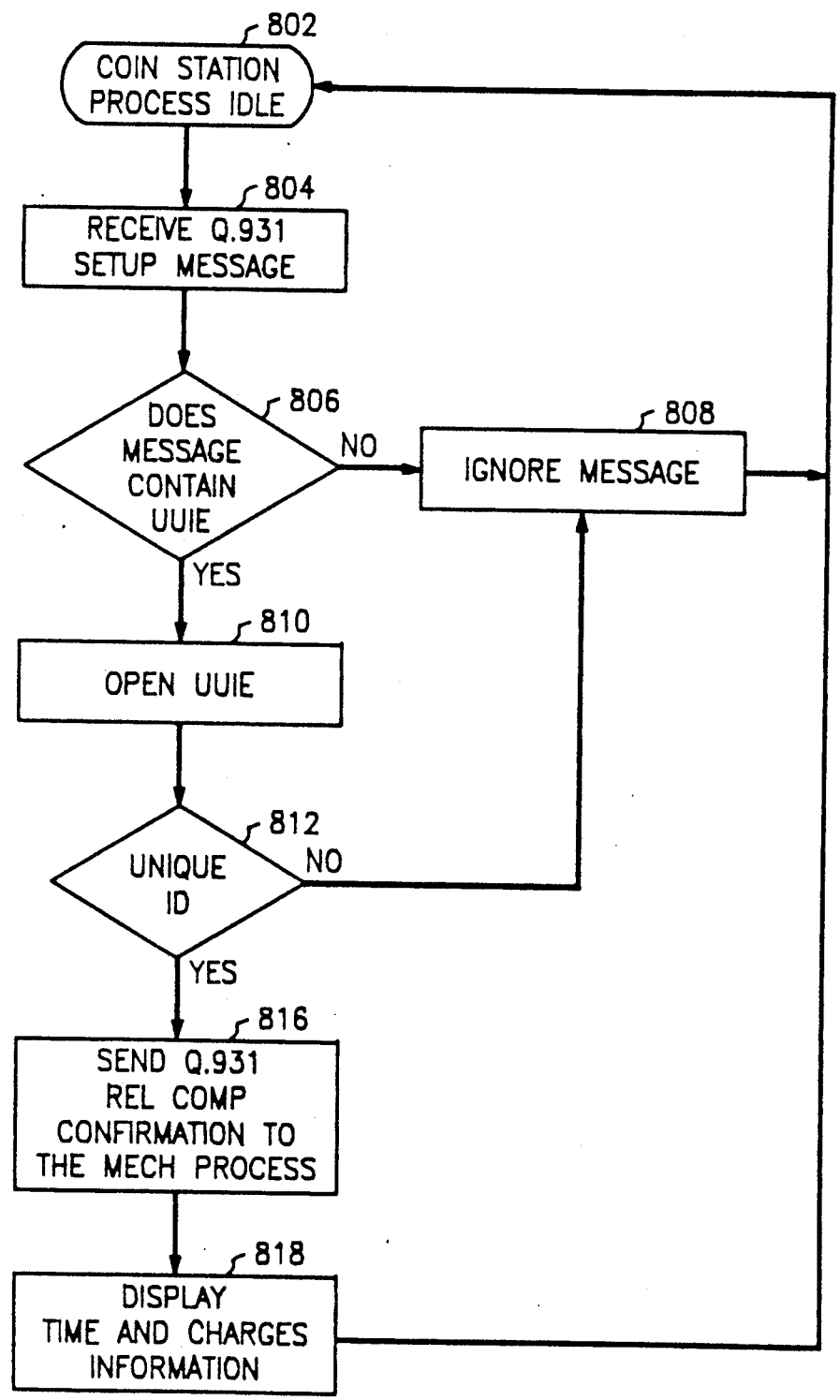

FIG. 8 is flow diagram of the actions taken by the coin station process when a back party requests time and charges information. The coin station process is idle (block 802) until a Q.931 SETUP message is received from a switching system (action block 804). The process checks whether the SETUP message contains a UUIE (test 806). If it does not, the process ignores the SETUP message without displaying any information (action block 808). Otherwise, the process "opens" the UUIE (action block 810) and verifies if the UUIE has a unique coin station identifier (UCSI) (310 in FIG.3), that matches the UCSI generated for the last outgoing call (test 812). This UCSI verifies that the information in the UUIE is associated with the back party. If the UCSI does not match (test 812), the process ignores the SETUP message without displaying any information (action block 808). If, on the other hand, if the UCSI matches that generated for the last outgoing call, the process sends a Q.931 REL COMP confirmation message to the modified MECH process via an ISDN D-channel (action block 816) to terminate the call and displays the time and charges information on the display screen of the phone (action block 818). The coin station process then returns to idle (block 802).

It is to be understood that the above-described procedures are merely illustrative of the principles of the present invention and many variations may be devised by those skilled in the art without departing from the spirit and scope of the invention. For example, instead of visually displaying time and charges information, the intelligent phone could alternatively relay the information to a public phone customer as a voice message.

We claim:

1. A method of sending call data from a switching system to a telecommunications station, comprising the steps of:
   responsive to a termination of a call between the switching system and the station, forming a call message at the switching system, the message comprising data pertaining to the terminated call;
   sending the message to the station over a signaling link for producing a humanly sensible indication of the data at the station.

2. The method of claim 1 wherein the humanly sensible indication is a visual display.

3. The method of claim 1 wherein the data comprises time and charges data for the terminated call.

4. The method of claim 1 wherein the forming step further comprises:
   formating the call data into a user information data block; and
   placing the user information data block in a call setup message.

5. The method of claim 4 wherein the user information data block comprises a unique identifier (UI) associated with the terminated call, further comprising:
   verifying that the message contains a user information data block; and
   if the UI matches an identifier previously generated by the station for the terminated call, displaying the data at the station.

6. The method of claim 1 wherein the call message comprises a call setup request message, further comprising the step of:
   rejecting the call setup request from the system at the station to avoid establishing a voice call between the system and the station.

7. A method of sending call data from a switching system to a telecommunications station, wherein the system and the station are equipped to handle CCITT (International Consultative Committee for Telephone and Telegraph) standard Layer 3 (Q.931) control messages defined for message associated user-to-user information (MA-UUI), and wherein the system and the station are connected via an integrated services digital network (ISDN) basic rate interface (BRI), comprising the steps of:
   responsive to a termination of a call between the switching system and the station, forming a Q931 SETUP at the switching system, the message comprising data pertaining to the terminated call; and
   sending the message to the station over an ISDN D-channel for producing a humanly sensible indication of the data at the station.

8. The method of claim 7 wherein the humanly sensible indication is a visual display.

9. The method of claim 8 wherein the data comprises time and charges data for the terminated call.

10. The method of claim 7 wherein the forming step further comprises:
    formatting the call data into a user-to-user information element (UUIE); and
    placing the UUIE into the SETUP message.

11. The method of claim 10 wherein the UUIE comprises a unique identifier (UI) associated with the terminated call, further comprising:
    responsive to a receipt of the SETUP message at the station, verifying that the SETUP message contains a UUIE; and
    if the UI matches a UI generated by the station for the terminated call, displaying the data at the station.

12. The method of claim 7 wherein the SETUP message comprises a call setup request message, further comprising the step of:
    rejecting the call setup request from the system at the station to avoid establishing an ISDN B-channel call between the system and the station.

13. Apparatus for sending call data from a switching system to a telecommunications station, comprising:
    a switching network, connectable to the station; and
    control means, operable under the control of a switching system program process, for controlling a:
    formation of a call message at the switching system, comprising time and charges data associated with the call after a termination of the call; and a
    transmission of the message through the network to the station for controlling a display of the time and charges data at the station and a rejection of subsequent call setup operations between the network and the station.

14. In an intelligent telecommunications station, apparatus for receiving time and charges call data from a switching system following a termination of a call, comprising:
    means, responsive to the receipt of a message comprising the call data, for extracting the call data in the message; and
    responsive to the means for extracting, means for displaying the data at the station.

15. The apparatus of claim 14 further comprising:
    means, responsive to the receipt of the message comprising the call data, for checking the correspondence of a unique identifier of the message with a unique identifier originally supplied by the station for the call.

16. The apparatus of claim 14 wherein the message comprises a call setup message, further comprising:
means for rejecting a call setup request of the call setup message from the switching system at the intelligent telecommunications station to avoid establishing a call between the system and the station.

17. Apparatus for sending call data from a switching system to a telecommunications station, comprising:
an integrated services digital network (ISDN), connectable to the station via a basic rate interface (BRI), and equipped to handle CCITT (International Consultative Committee for Telephone and Telegraph) standard layer 3 (Q.931) standard call control messages defined for message associated user-to-user information (MA-UUI); and
control means, operable under the control of a switching system program process, for controlling a:
formation of a Q.931 SETUP message at the switching system, comprising a user-to-user information element (UUIE) containing time and charges data associated with a call from the station after a termination of the call; and a
transmission of the message through the network over an ISDN D-channel of the BRI to the station for controlling a display of the time and charges data at the station and for rejecting subsequent call setup operations between the network and the station over an ISDN B-channel of the BRI.

18. An intelligent integrated services digital network (ISDN) station comprising:
means for receiving a CCITT (International Consultative Committee for Telephone and telegraph) standard layer 3 (Q.931) SETUP message over an ISDN D-channel, after termination of a call, the SETUP message comprising a user-to-user information element (UUIE) containing time and charges data for the call; and
means responsive to said means for receiving for effecting a visual display of the data at the station.

19. The station of claim 18 further comprising:
means for rejecting a call setup request in the SETUP message for establishing an ISDN B-channel connection.

20. A method of sending call data from a switching system to an intelligent telecommunications station, wherein the station and the system are connected via an integrated services digital network (ISDN) basic rate interface (BRI), and wherein the station and the system communicate with each other using CCITT (International Consultative Committee for Telephone and Telegraph) standard Layer 3 (Q.931) call control messages defined for message associated user-to-user information (MA-UUI) to send user-to-user information elements (UUIEs), comprising the steps of:
responsive to origination of an outgoing call at the station, generating a unique station identifier, wherein the identifier uniquely associates the outgoing call with the station;
forming a UUIE comprising the identifier;
placing the UUIE in a Q.931 SETUP message;
sending the message to the system over an ISDN D-channel;
responsive to termination of the call, the system forming a second UUIE, comprising the identifier and data associated with the call;
placing the second UUIE in a second Q.931 SETUP message;
sending the second message to the station over an ISDN D-channel;
responsive to receipt of the second message by the station, verifying that the identifier in the second UUIE matches the identifier generated at the station; and
responsive to a successful verification, rejecting a call setup request in the SETUP message to establish an ISDN B-channel connection and displaying the call data at the station.

* * * * *

UNITED STATES PATENT AND TRADEMARK OFFICE
CERTIFICATE OF CORRECTION

PATENT NO. : 5,043,983
DATED : August 27, 1991
INVENTOR(S) : Gary L. Dorst, Francis J. Pope, III It is certified that error appears in the above-identified patent and that said Letters Patent is hereby corrected as shown below:

Column 10, claim 7, line 12, delete "Q931" and substitute --Q.931--.

Column 10, claim 7, line 13, after "SETUP" insert --message--.

Signed and Sealed this

Tenth Day of November, 1992

Attest:

DOUGLAS B. COMER

*Attesting Officer*  *Acting Commissioner of Patents and Trademarks*